United States Patent [19]
Tadakuma et al.

[11] Patent Number: 5,808,768
[45] Date of Patent: Sep. 15, 1998

[54] OPTICAL TELECOMMUNICATIONS SYSTEM

[75] Inventors: Masateru Tadakuma, Ichihara; Masahito Morimoto, Tokyo; Hijiri Nimura; Haruki Ogoshi, both of Chiba, all of Japan

[73] Assignee: The Furukawa Electric Co., Ltd., Tokyo, Japan

[21] Appl. No.: 570,774

[22] Filed: Dec. 12, 1995

[51] Int. Cl.[6] .................................................. H04B 10/00

[52] U.S. Cl. .......................... 359/156; 359/122; 359/181; 372/27

[58] Field of Search ..................................... 359/122, 134, 359/156, 160, 181; 372/6, 27

[56] References Cited

U.S. PATENT DOCUMENTS 5,469,455 11/1995 Reitz et al. ................................ 372/27
5,546,414 8/1996 Pfeiffer ...................................... 372/6

Primary Examiner—Kinfe-Michael Negash
Attorney, Agent, or Firm—Jacobson, Price, Holman & Stern, PLLC

[57] ABSTRACT

There is provided an optical telecommunications method that can externally modulate a plane of polarization without producing any null point. According to the invention, in an optical telecommunications system for externally modulating the plane of polarization of the light being transmitted through an optical fiber for the transmission of a polarized wave signal by externally applying a signal to modify the state of polarization, the source of light for the transmission of a polarized wave signal is a fiber ring laser.

1 Claim, 3 Drawing Sheets

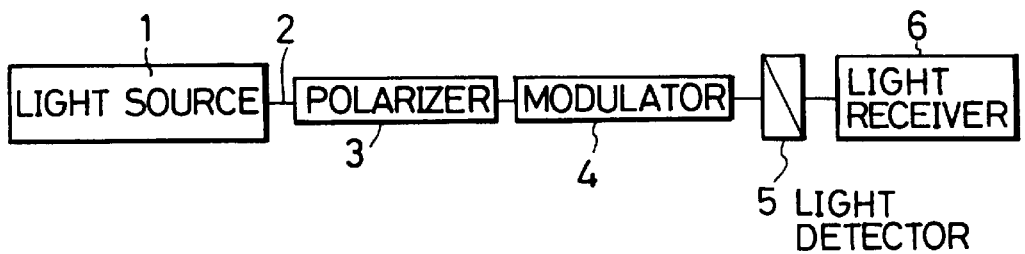
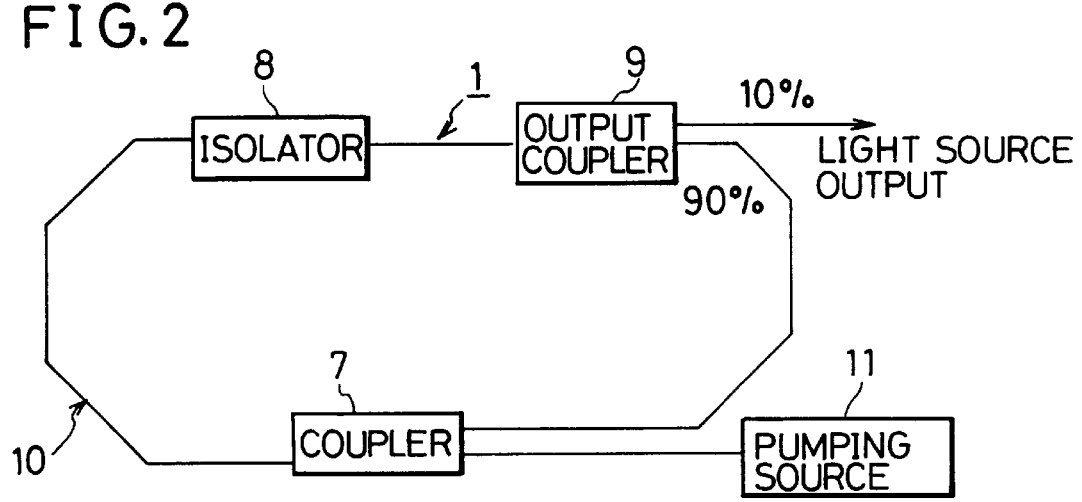
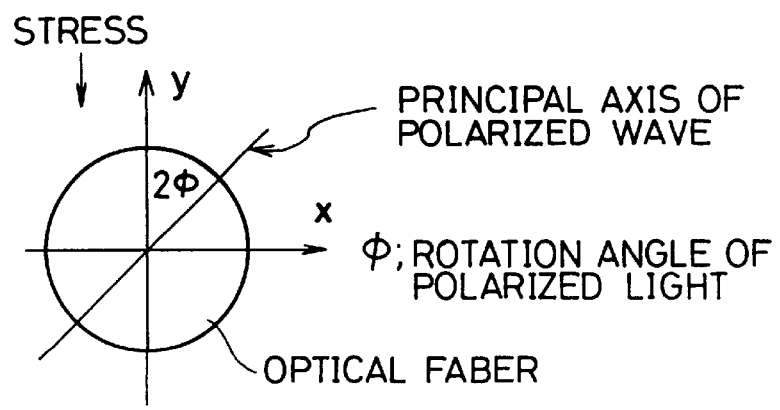

OPTICAL TELECOMMUNICATIONS SYSTEM

BACKGROUND OF THE INVENTION

1. [Field of the Invention]

This invention relates to an optical telecommunications system for modulating the state of polarization of the light being transmitted through an optical fiber by externally applying a polarization modifying signal to the optical fiber.

2. [Prior Art]

There is a known phenomenon that the state of polarization of the light being transmitted through a single mode optical fiber is modified when an external ultrasonic or magnetic signal is applied thereto because of a phenomenon generally known as the photoelastic effect or Faraday effect. This phenomenon can provide an obstacle to be overcome for telecommunications by means of coherent light.

However, it is possible to realize external modulation type signal transmission by positively utilizing this phenomenon and there have been developed a number of nondisconnection type optical modulators produced by combining an ultrasonic external modulator and a receiver using leakage light due to a localized bend of an optical fiber and discriminators for identifying and selecting a desired one out of a plurality of optical telecommunications paths such as optical cables, optical cords, optical fibers or tape-shaped coated optical fibers.

There is a type of optical modulator for applying an ultrasonic wave wave signal to an optical fiber as an external signal in order to modify the state of polarization.

FIG. 6(b) of the accompanying drawings illustrates the principle of the operation of modulating the plane of polarization by applying an external ultrasonic wave signal.

FIG. 6(a) of the accompanying drawings illustrates a conventional optical telecommunications system comprising a light source 21, an optical fiber 22, a piezoelectric element 23, a light detector 24 and a light receiver 25.

Now, assume a three-dimensional coordinate system having a Z-axis that agrees with the longitudinal axis of the optical fiber 22. The system has X- and Y-axes running perpendicular to the X-axis. As light passes through the optical fiber 22 along the axis thereof, the optical fiber is subjected to stress by an ultrasonic wave with a frequency of o applied to it along the Y-direction by means of a piezoelectric element 23. Because of the stress, the optical fiber is caused to exhibit a higher density in the Y-direction and a lower density in the X-direction and, consequently, give rise to a difference in the refractive index between the X and Y-directions.

The difference in the refractive index in turn produces a phase difference in the light passing through the optical fiber between the polarization in the direction of application of the stress and the polarization in a direction perpendicular to the stress. A signal representing the phase difference is transmitted through the optical fiber 22 and passes through the light detector 24 of the reception side before it is converted into an intensity modulation signal and received by the light receiver 25. The above procedure of modulation can be expressed by the following formulas.

Assume that the initial state of light incident to the ultrasonic wave applying section is expressed by equations (1) below.

$$Ex = a \cos \omega_o t$$

$$Ey = b \cos(\omega_o t + \phi) \quad (1)$$

where a; X amplitude of polarization in the X-direction, b; Y amplitude of polarization in the Y-direction, $\omega_o$; angular frequency of light and $\phi$; initial phase difference.

After passing through the ultrasonic wave applying section, a phase difference as expressed by equations (2) below is produced.

$$E'x = a \cos[\omega_o t + \alpha(t)]$$

$$E'y = b \cos[\omega_o t + \phi + \beta(t)] \quad (2)$$

where $\alpha(t)$; the phase Shift in the X-direction due to the external modulation and $\beta(t)$; the phase shift in the Y-direction due to the external modulation.

Thus, the electric field received by the light receiver after passing through the light detector is expressed by equation (3) below.

$$E = D(E'_x \cos \gamma + E'_y \sin \gamma) \quad (3)$$

where

D; transmission factor of the light detector and $\gamma$; angle between the light detector and the X-axis.

The, intensity of the detected light is expressed by equation (4) below.

$$\begin{aligned} I &= CE \cdot E^* \\ &= CD^2[(a^2\cos^2\gamma + b^2\sin^2\gamma) + ab\sin 2\gamma \sin[\alpha(t) - \beta(t) - \phi + \pi/2]] \end{aligned} \quad (4)$$

where

C; constant.

Then, the received signal can be divided into a DC component expressed by the first term and an AC component expressed by the second term of equation (4).

With a system of externally modulating the plane of polarization, there can theoretically be a state where a signal light is not modulated if an external modulation signal is applied depending on the state of modulation of incident light.

This state is referred to as the nonmodulation point (or null point) and provides a problem for optical telecommunications.

It will be understood that signal light cannot be modulated by external modulation if the AC component of the second term of equation (4) is equal to zero.

Such a state takes place when the following requirements are met.

$$a=0 \text{ or } b=0 \quad (5)$$

and $$g = n z / 2 \quad (6)$$

Expression (5) above is a factor attributable to a signal applying section and holds true when the incident polarized wave is linearly modulated and the angle of the principal axis of the wave and the coordinate axis is equal to 0 or $\pi/2$.

Expression (6) holds true when the angle between the light detector and the principal axis of the light incident to the light detector is equal to 0 or $\pi/2$ multiplied by an integer.

A null point refers to a state where the intensity of light or equation (4) does not change if an external modulation signal is applied. In such a state, either expression (5) or (6) holds true.

The condition where equation (6) holds true can be avoided either by rotating the principal axis of the light detector or by using a plurality of light detectors.

The condition where at least one of the equations of (5) holds true can be avoided by applying identical modulation signals simultaneously along a plurality of directions, any adjacent ones of which are differentiated by an angle less than $\pi/2$.

However, this technique is useless when signals can be applied only along a single direction.

It is therefore an object of the present invention to solve the above problem by providing an optical telecommunications method that can externally modulate a plane of polarization without producing any null point.

SUMMARY OF THE INVENTION

According to the invention, the above object is achieved by providing an optical telecommunications system for externally modulating the plane of polarization of the light being transmitted through an optical fiber for the transmission of a polarized wave signal by externally applying a signal to modify the state of polarization, characterized in that the source of light for the transmission of a polarized wave signal is a fiber ring laser.

An optical telecommunications system for externally modulating the plane of polarization according to the invention utilizes for the source of light for the transmission of a polarized wave signal a fiber ring laser having an elliptic plane of polarization that is produced by rotatory nonlinear polarization and rotates at an enhanced rate. A fiber ring laser can make a light source with which the principal axis of polarized wave rotates with a frequency of G1 (Hz)).

More specifically, with a system according to the present invention, a fiber ring laser is utilized as a polarized wave scrambler that generates light in a randomly polarized state.

The state of polarization of light generated by a fiber ring laser uniformly changes as a function of frequency G1 (Hz) and, therefore, the existence of a null point as expressed by formula (5) is eliminated by modulation of $\omega(<G1)$ (Hz) at the signal applying section.

Now, the present invention will be described by referring to the accompanying drawings that illustrate a preferred mode of carrying out the invention.

DESCRIPTION OF THE ACCOMPANYING DRAWINGS

FIG. 1 is a schematic diagram of an embodiment of an optical telecommunications system according to the invention and comprising a fiber ring laser as a light source.

FIG. 2 is a schematic diagram of a fiber ring laser that can be used for the embodiment of FIG. 1.

FIG. 3 is an illustration showing the principle of the operation of modulating the plane of polarization at the signal applying section of the embodiment of FIG. 1.

DETAILED DESCRIPTION OF THE PREFERRED EMBODIMENT

Figure 4:
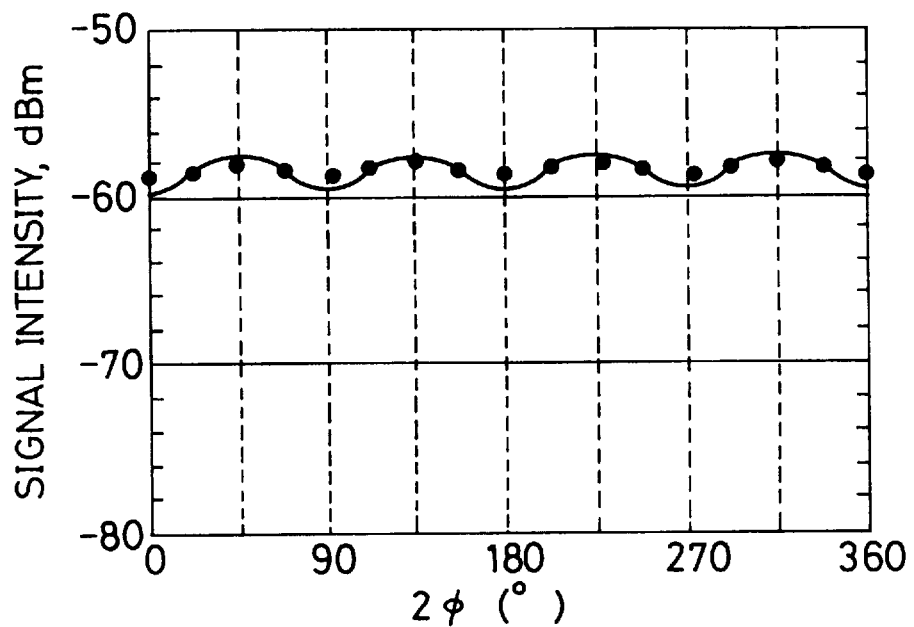
FIG. 4 is a graph showing the relationship between the angle formed by the principal axis of incident polarized wave and the direction along which stress is applied and the intensity of the signal received by the light receiver of the embodiment of the optical telecommunications system of FIG. 1.

FIG. 1 is a schematic diagram of an embodiment of the optical telecommunications system according to the invention and comprising a fiber ring laser as a light source.

Referring to FIG. 1, the embodiment comprises a light source 1 that is a fiber ring laser, an optical fiber 2, a polarizer 3 (½ wavelength plate), a modulator 4, a light detector 5 and a light receiver 6.

FIG. 2 is a schematic diagram of a fiber ring laser that can be used for the embodiment of FIG. 1.

The fiber ring laser comprises a pumping source 11 that may typically be a semiconductor laser having a center wavelength of 1.48 $\mu$m, a wavelength division multiplexing coupler (hereinafter referred to as WDM) 7, a polarization independent isolator 8, an output coupler 9 and an erbium-doped coupler 10. In this embodiment, the resonator length is 10 m.

The state of polarization of the output signal from the fiber ring laser source 1 is repeated with a frequency G1 (Hz) that is determined by the resonator length 10 m and expressed by equation (7) below.

$$G1 = \frac{c/n}{L} = \frac{c}{nL} \tag{7}$$

where c; light velocity n; core refractive index

Light generated by the semiconductor laser 6 is transmitted through the erbium-doped fiber 10 by way of the WDM coupler 7. The isolator 8 is inserted into the ring resonator for one-sided oscillation.

The population of erbium ions ($Er^{3+}$) that is the laser activation element in the fiber ring resonator is inverted by excited light in the fiber ring resonator to give rise to a stimulated emission of light. The emitted light is then taken out by the output coupler having a branching ratio of 9:1.

Figure 6A:
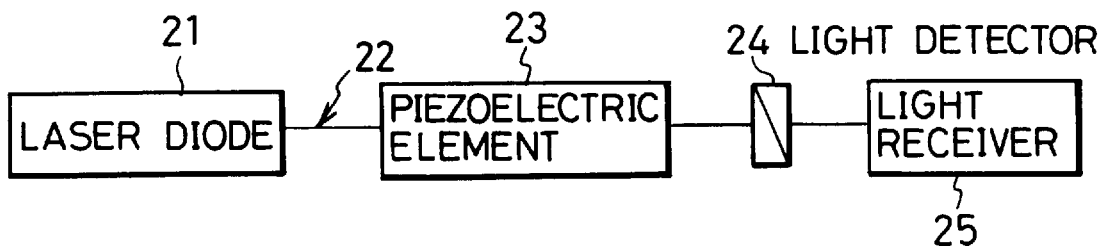
FIG. 6(a) is a schematic diagram of a conventional optical telecommunications system.
Figure 6B:
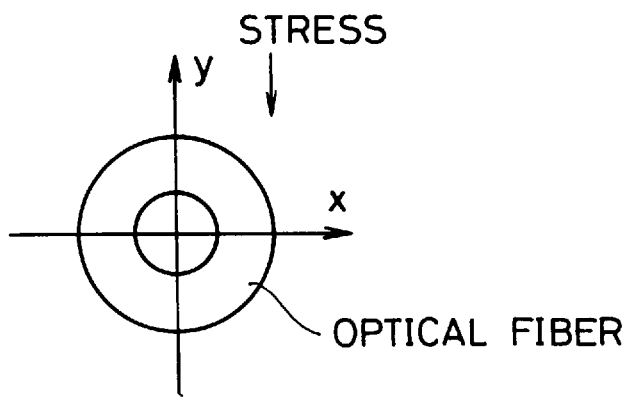
FIG. 6(b) is an illustration showing the principle of the operation of modulating the plane of polarization by applying an external ultrasonic wave signal of the conventional optical telecommunications system of FIG. 6(a).

FIG. 3 is an illustration showing the principle of the operation of modulating the plane of polarization at the signal applying section of the embodiment of FIG. 1. There are assumed a Z-axis running along the longitudinal axis of the optical fiber 2 and X- and Y-axes perpendicular to the Z-axis. The principle is essentially the same as that of the conventional operation of modulating the plane of polarization as illustrated in FIG. 6(a). Light generated by the fiber ring laser 1 and having a scrambled plane of polarization is introduced into the ultrasonic wave applying section 4, where the light is subjected to stress by an ultrasonic wave having a frequency $\omega$ (<G1) (Hz) along the Y-direction by means of a piezoelectric element. The light having a scrambled plane of polarization has a polarization component that periodically would not show an angle of 0 nor $\pi/2$ relative to the direction along which the stress is applied (Y-direction) with a period of 1/G1 (sec).

Therefore, the requirement of expression (5) for a null point is not met in the signal applying section 4 if the frequency is found within a region of ω (<G1) (Hz).

As will be described below, an experiment was conducted, using the above embodiment.

In this experiment, a fiber ring laser source 1 was used as the light source and its performance was compared with that of the conventional laser diode 21 of shown in FIG. 6(a).

If the angle of rotation of the polarizer (½ wavelength plate) is φ, the direction of the principal axis of polarized wave of the light emitted from the light source is shifted by 2φ degrees by the stress applying section.

A null point where the signal intensity was minimized was observed for the system comprising the laser diode 21.

Figure 5:
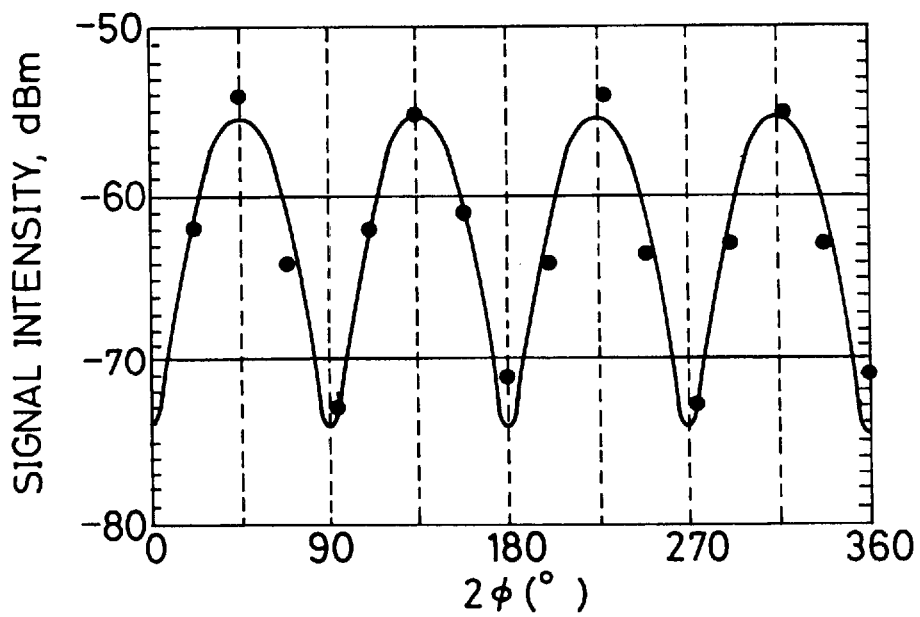
FIG. 5 is a graph showing the relationship between the angle formed by the principal axis of the incident polarized wave and the direction along which stress is applied and the intensity of the signal received by the light receiver of a conventional optical telecommunications system.

The change in the intensity of the signal received by the light receiver 6 relative to the change in the angle of 2φ between the principal axis of the incident polarized wave and the direction of stress application observed in the experiment is shown in FIG. 4 for the fiber ring laser source 1 and in FIG. 5 for the laser diode 21, when the angle between the principal axis of the incident polarized wave and the direction of stress application was 0 degree at an observed null point and the angle of rotation φ of the polarizer was 0 degree.

In the case of using a laser diode 21, a null point was observed for 2φ=0, 90, 180, 270 and 360 degrees as seen from FIG. 5. The difference in the intensity between the highest point and the lowest point was 24 dB.

At the lowest point (null point), no modulation signal can be transmitted if the plane of polarization is externally modulated. Thus, it will be understood from FIG. 5 that values of 2φ=45, 135, 225 and 315 have to be selected in order to obtain a maximized signal intensity, when a laser diode 21 is used and the plane of polarization is externally modulated. As seen from FIG. 5, there exist lowest points for the signal intensity if a fiber ring laser source 1 is used.

This may be because light emitted from a fiber ring laser source 1 is not completely unpolarized but comprises a polarized component that satisfies the requirement of formula (5).

However, the difference between the highest point and the lowest point for a fiber ring laser source 1 is 1 dB at most as shown in FIG. 4 and the existence of null points cannot significantly affect the modulation of the plane of polarization if compared with the case where a laser diode 21 is used.

Thus, a fiber ring laser can be used as a light source that is substantially free from the problem of plane of polarization of incident light for an optical telecommunications system involving external modulation of the plane of polarization.

As described above, an optical telecommunications system for externally modulating the plane of polarization according to the invention utilizes for the source of light for the transmission of a polarized wave signal a fiber ring laser having an elliptic plane of polarization that is produced by rotatory nonlinear polarization and rotates at an enhanced rate. A fiber ring laser can make a light source with which the principal axis of the polarized wave rotates with a frequency of G1 (Hz).

More specifically, with a system according to the present invention, a fiber ring laser is utilized as a polarized wave scrambler that generates light in a randomly polarized state. The state of polarization of light generated by a fiber ring laser uniformly changes as a function of frequency G1 (Hz) and, therefore, the existence of a null point as expressed by formula (5) is eliminated by modulation of φ (<G1) (Hz) at the signal applying section.

What is claimed is:

1. An optical telecommunications system for externally modulating the plane of polarization of light being transmitted through an optical fiber for transmission of a polarized wave signal by externally applying a signal to modify the state of polarization, wherein a source of light for the transmission of said polarized wave signal is a fiber ring laser comprising a polarized wave scrambler which generates light having a randomly polarized state.

* * * * *